(12) United States Patent
Redford et al.

(10) Patent No.: US 11,519,337 B2
(45) Date of Patent: Dec. 6, 2022

(54) GAS TURBINE AUXILIARY POWER UNIT

(71) Applicant: PRATT & WHITNEY CANADA CORP., Longueuil (CA)

(72) Inventors: Timothy Redford, Campbellville (CA); David Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 605 days.

(21) Appl. No.: 16/449,836

(22) Filed: Jun. 24, 2019

(65) Prior Publication Data

US 2020/0400077 A1 Dec. 24, 2020

(51) Int. Cl.
*F02C 7/32* (2006.01)
*F02C 7/36* (2006.01)
*F01D 15/12* (2006.01)

(52) U.S. Cl.
CPC ............ *F02C 7/32* (2013.01); *F02C 7/36* (2013.01); *F05D 2220/323* (2013.01); *F05D 2220/50* (2013.01); *F05D 2240/35* (2013.01); *F05D 2240/60* (2013.01); *F05D 2260/40311* (2013.01)

(58) Field of Classification Search
CPC ........ F02C 7/32; F02C 7/36; F05D 2220/323; F05D 2220/50; F05D 2240/35; F05D 2240/60; F05D 2260/40311; F01D 15/12
See application file for complete search history.

(56) References Cited

U.S. PATENT DOCUMENTS

| 4,206,596 A * | 6/1980 | Kuziak, Jr. | F02C 7/36 60/791 |
|---|---|---|---|
| 7,351,174 B2 | 4/2008 | Beutin et al. | |
| 8,424,280 B2 * | 4/2013 | Moore | F02C 7/32 60/39.163 |
| 2008/0072568 A1 * | 3/2008 | Moniz | F01D 25/34 60/226.1 |
| 2008/0148881 A1 * | 6/2008 | Moniz | F02C 7/32 74/15.6 |
| 2009/0064683 A1 * | 3/2009 | Moniz | F02C 7/36 60/792 |
| 2018/0058330 A1 | 3/2018 | Munevar | |
| 2018/0149115 A1 * | 5/2018 | Razak | F02C 6/003 |
| 2018/0172012 A1 * | 6/2018 | Plante | F02C 7/36 |
| 2018/0266329 A1 * | 9/2018 | Mackin | H02K 7/116 |
| 2019/0368370 A1 * | 12/2019 | Chandler | F02K 3/06 |
| 2020/0102885 A1 * | 4/2020 | Kupratis | B64D 13/02 |
| 2020/0256258 A1 * | 8/2020 | Duong | F01D 15/12 |

\* cited by examiner

*Primary Examiner* — Tisha D Lewis
(74) *Attorney, Agent, or Firm* — Norton Rose Fulbright Canada LLP (57) ABSTRACT

An auxiliary power unit (APU) includes, in serial flow communication: an engine compressor, a combustor and a turbine, the turbine rotatable about an engine axis. A first shaft operatively connects the turbine to the engine compressor and extends non-parallel to the engine axis. A second shaft operatively connects the turbine to a load and extends non-parallel to the engine axis. A method of operating an APU is also described.

17 Claims, 6 Drawing Sheets

GAS TURBINE AUXILIARY POWER UNIT

TECHNICAL FIELD

The application relates generally to gas turbine auxiliary power units for aircraft.

BACKGROUND OF THE ART

The sizing of an auxiliary power unit (APU) for an aircraft is typically determined by requirements at a highest commanded generator power and/or Environmental Control System (ECS) flow, leaving the APU running below its maximum power at other points of the operating envelope. Inefficiencies typically exist in space taken up by aircraft components and/or in the complexity and/or cost of manufacturing aircraft components that make efficient use of space.

SUMMARY

In one aspect, there is provided an auxiliary power unit (APU), comprising: in serial flow communication, an engine compressor, a combustor and a turbine, the turbine rotatable about an engine axis; a first shaft operatively connecting the turbine to the engine compressor, the first shaft extending non-parallel to the engine axis; and a second shaft operatively connecting the turbine to a load, the second shaft extending non-parallel to the engine axis.

In some embodiments, the first shaft operatively connects the turbine to the engine compressor via a gear train and a third shaft connected to the turbine; and the second shaft is operatively connected to the turbine via the gear train.

In some embodiments, the first shaft is oriented at a first non-zero angle to the engine axis, the first non-zero angle being equal to or smaller than 90 degrees.

In some embodiments, the second shaft is oriented at a second non-zero angle to the engine axis, the second non-zero angle being equal to or smaller than 90 degrees.

In some embodiments, the first shaft is substantially perpendicular to the engine axis.

In some embodiments, the second shaft is substantially perpendicular to the engine axis.

In some embodiments, the gear train is a differential gear train.

In some embodiments, the differential gear train includes a bevel gear.

In some embodiments, the gear train is a differential gear train; the third shaft is connected to a bevel gear train; and a fourth shaft connects the bevel gear train to the turbine.

In some embodiments, the load includes at least one of: a load compressor, and a generator.

In some embodiments, the APU comprises a core gas flow path downstream of the combustor, the core gas flow path extending between the gearbox and the engine compressor.

In some embodiments, the engine compressor is a boost compressor, the turbine is a power turbine, the APU includes a high pressure compressor and a high pressure turbine in serial flow communication with the combustor, the boost compressor, the high pressure compressor, the high pressure turbine, and the power turbine are part of a core gas flow path, and the core gas flow path includes a flow reversing section fluidly disposed between the boost compressor and the high pressure compressor.

In another aspect, there is provided a gas turbine auxiliary power unit (APU), comprising: in serial flow communication, a first engine compressor, a second engine compressor, a combustor and a turbine, the second engine compressor and the turbine being rotatable about an engine axis, the first engine compressor configured to be driven by the turbine, a rotation axis of the first engine compressor being non-parallel to the engine axis.

In some embodiments, the gas turbine APU comprises a differential gear train connecting the turbine to the first engine compressor.

In some embodiments, the gas turbine APU comprises a core air flow path directing air from the first compressor to the second compressor, the core air flow path including a flow reversing section.

In some embodiments, the gas turbine APU comprises a gear train connecting the first engine compressor to the turbine.

In some embodiments, the gas turbine APU further comprises an electrical generator connected to the first engine compressor.

In another aspect, there is provided a method of operating an auxiliary power unit (APU), comprising: generating exhaust gases in a combustor of a gas turbine engine to drive a turbine about an engine axis; rotating a first shaft non-parallel to the engine axis using power from the turbine and using the first shaft to drive a compressor of the gas turbine engine; and rotating a second shaft non-parallel to the engine axis using power from the turbine and using the second shaft to drive a load.

In some embodiments, the driving the load includes driving a load compressor to supply air to a pneumatic system of an aircraft.

In some embodiments, the driving the load includes driving an electric generator to power an electrical system of the aircraft.

The foregoing examples are non-limiting.

DESCRIPTION OF THE DRAWINGS

Reference is now made to the accompanying figures in which.

DETAILED DESCRIPTION

For the purposes of the present description, the term "flow path" when used with respect to a fluid, such as air, is used to describe an arrangement of one or more elements, such as one or more hoses, ducts, compressor and/or turbine sections, connectors, seals, and other elements, that together form the flow path for the fluid to flow from one point to another, with the elements being selected, such as via conventional engineering and manufacturing principles for example, to provide the particular functionality that the flow path is described to have.

Figure 1:
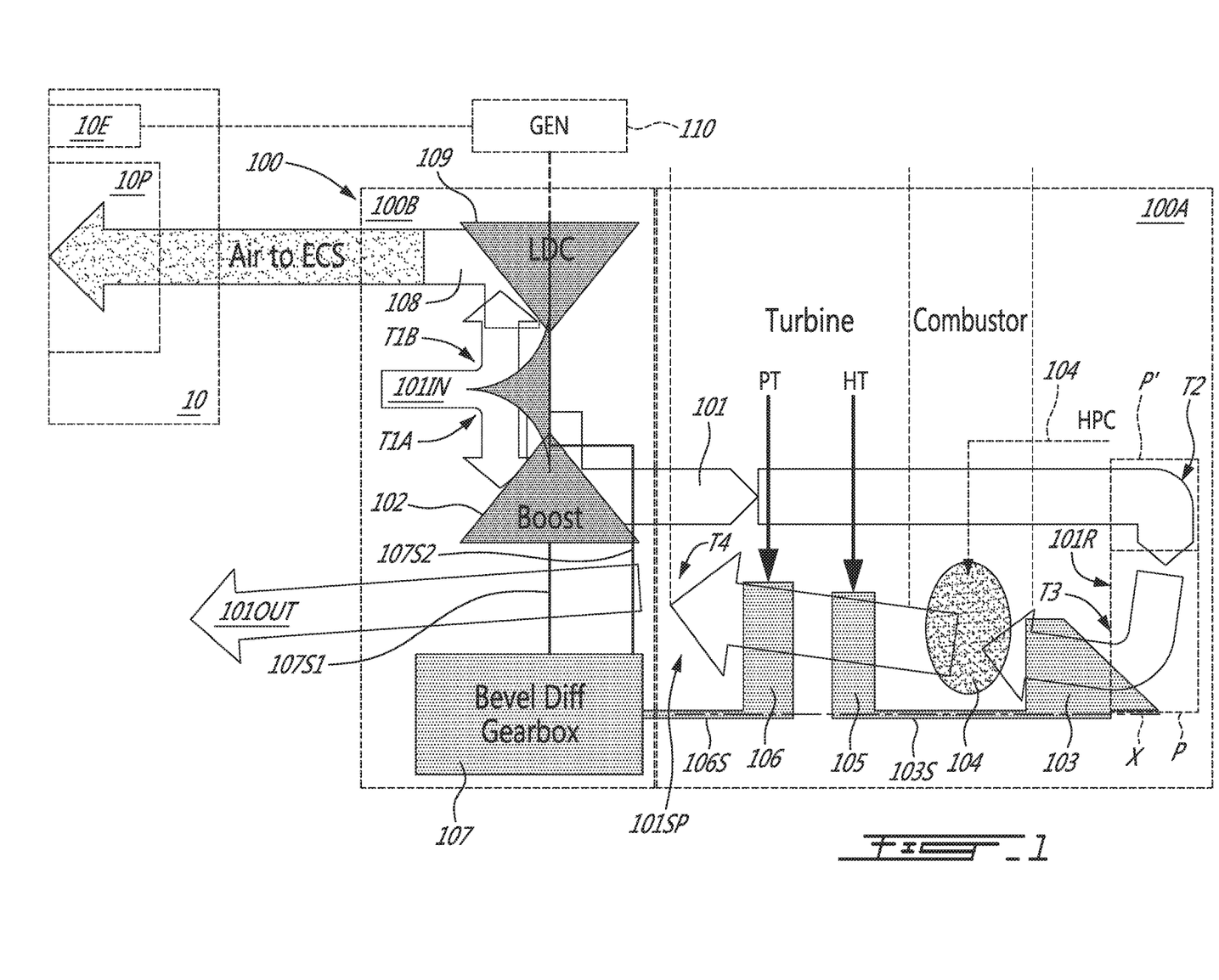
FIG. 1 is a schematic showing an auxiliary power unit.

FIG. 1 schematically shows a gas turbine auxiliary power unit (APU) 100 serving an aircraft 10. The APU 100 is one particular example of an engine with respect to which, or in which, the present technology may be used. It is contemplated that the present technology may be applied to any other suitable type of engine. In the illustrated embodiment, the APU 100 is operable to supply compressed air to a pneumatic system 10P of the aircraft 10, and electrical power to an electrical system 10E of the aircraft 10. The pneumatic and electric systems 10P, and the aircraft 10, may be conventional and are therefore not shown in detail or described in detail herein. As an example, the pneumatic system 10P may be an Environmental Control System (ECS) that provides pressurization and/or air conditioning of a cabin of the aircraft 10. Other examples of pneumatic systems 10P may provide anti-icing functionality and/or enable main engine start. In the present embodiment, the APU 100 may be mounted to the aircraft 10, such as in a tail cone of the aircraft 10 for example, and may be controlled by one or more suitable controllers, such as one or more conventional controllers, of the aircraft 10 and/or of the APU 100.

In the present embodiment, the APU 100 includes a core air flow path 101 via which core airflow through the APU 100 is processed. In the present embodiment, the core air flow path 101 includes, and is defined in part by, in serial flow communication, an air inlet 101IN, a boost compressor 102, a high pressure compressor 103, a combustor 104, a high pressure turbine 105, a power turbine 106, and an outlet 101OUT.

As shown in FIG. 1, in the present embodiment, the core air flow path 101 directs a part of an ambient airflow coming into the air inlet 101IN toward the boost compressor 102 via an orthogonal or obtuse turn T1A. While in this embodiment the air inlet 101IN connects into the boost compressor 102 from a side of the boost compressor 102 opposite the combustor 104, this may not be the case in other embodiments. For example, in some embodiments, the air inlet 101IN may be ducted into the boost compressor 102 from any suitable direction radially and/or may have a radial inlet configuration in which it would bring in air from all radial directions simultaneously. When driven, the boost compressor 102 draws ambient air (hereinafter, "core air") into the core air flow path 101 via the air inlet 101IN and compresses the core air for delivery to the high pressure compressor 103. From an outlet of the boost compressor 102, the compressed core air is driven toward an inlet of the high pressure compressor 103 via two right or obtuse turns T2, T3, which may be defined in part by corresponding duct elbows for example.

In an aspect, such a turn configuration may help reduce an overall length of the APU 100 and/or an air pressure drop through the core air flow path 101. With respect to pressure drop, in some embodiments, the core air flow path 101 has only the three turns T1, T2 and T3, with the boost compressor 102 optionally providing a fourth turn, upstream of the high pressure compressor 103, and is substantially straight between these turns. In some such embodiments, the core air flow path 101 is also substantially straight between the air inlet 101 and the turn T1. Stated otherwise, as seen in FIG. 1, the core gas flow path 101 includes a flow reversing section 101R that in this embodiment is defined by turns T2 and T3.

The flow reversing section 101R is disposed fluidly between the boost compressor 102 and the high pressure compressor 103. The flow reversing section 101R reverses the flow of air from the boost compressor 102 by about 180 degrees, and in some embodiments by anywhere between about 160 and 180 degrees, prior to introducing the air into the high pressure compressor 103. In some embodiments and applications, this helps the high pressure compressor 103 to operate more efficiently. In other embodiments, the flow reversing section 101R may be defined by a different combination and/or number of turns and/or may reverse the airflow by a different angle. In some embodiments, and as shown in FIG. 1, the core air flow path 101 may include a plenum (P) therein, such as in the flow reversing section 101R for example, for example between turns T2 and T3. In some embodiments, as shown, the plenum (P) may be made sufficiently large to eliminate one of the turns T2 and T3. In some embodiments, as shown with reference numeral (P'), the plenum (P) may be made sufficiently large to eliminate both of the turns T2 and T3. In an aspect, the plenum (P) may help improve conditions of the airflow received at the inlet to the high pressure compressor 103, and may therefore help improve efficiency and/or durability of the high pressure compressor 103 in at least some embodiments and applications. In some embodiments, the plenum (P) may be disposed between turns T1 and T2. In some embodiments, the plenum (P) may be omitted.

When driven, the high pressure compressor 103 further compresses the core air and delivers the core air into the combustor 104. The combustor 104 may be any suitable combustor, such as a conventional combustor using a conventional ignition and combustion management control systems for example. The core air is mixed with fuel in the combustor 104, which fuel is delivered via a fuel delivery system 104', such as a suitable conventional fuel delivery system for example. The air-fuel mixture is combusted to generate hot exhaust gases. The exhaust gases flow through a downstream portion of the core air flow path 101, and more particularly through the high pressure turbine 105 and then through the power turbine 106, thereby driving these turbines 105, 106.

As shown in FIG. 1, after the high pressure compressor 103, the core air flow path 101 is generally straight up to and including the outlet 101OUT. Stated otherwise, in this embodiment, after the high pressure compressor 103, the core air flow path 101 directs the core air and, after the combustor 104 the exhaust gases, to the outlet 101OUT along a generally straight portion 101SP of the core air flow path 101. In the present embodiment, the generally straight portion 101SP of the core air flow path 101 downstream of the high pressure compressor 103 may include one or more obtuse turns, such as turn T4, having an angle between about 120 and about 180 degrees. In some embodiments, the generally straight portion 101SP may be substantially straight.

In an aspect, a generally straight portion 101SP, and a substantially straight portion 101SP, of the core air flow path 101 downstream of the combustor 104 may help reduce an overall air pressure drop experienced by airflow through the core air flow path 101 between the air inlet 101IN and the outlet 101OUT. A reduced pressure drop may help improve an operating efficiency of the APU 100 in at least some applications and/or operating conditions. In this embodiment, the portion 101SP of the core air flow path 101 downstream of the combustor 104 may be made generally or substantially straight for at least some APU applications in which this was not possible with prior art APU architecture, due to a space/route in the APU 100 that may be provided using a drivetrain architecture of the APU 100 as described in detail below.

Still referring to FIG. 1, a "cold" portion of the APU 100 will now be described. In this embodiment, downstream of the air inlet 101IN but upstream of the boost compressor 102, the core air flow path 101 branches out, via an orthogonal or obtuse turn T1B, into a working air flow path 108. The working air flow path 108 directs a part of the ambient air flowing into the air inlet 101IN to the pneumatic system(s) 10P of the aircraft 10, via a load compressor 109 that defines part of the working air flow path 108. When the load compressor 109 is driven, it draws ambient air into the air inlet 101IN and into the turn T1B, compresses that ambient air, and supplies the compressed ambient air (hereinafter, "working air") to the pneumatic system(s) 10P of the aircraft 10. In other embodiments and/or applications, the load compressor 109 need not be fed ambient air and/or may be fed from a source different than the air inlet 101IN. Stated otherwise, it is contemplated that the load compressor 109 may be used to serve a different pneumatic load. While in this embodiment, the working air flow path 108 turns away from the combustor 104, in other embodiments, any other suitable working air flow path 108 arrangement could be used, such as a working air flow path 108 which may turn in a direction toward the combustor 104 for example.

In the present embodiment, and as described in more detail below, the load compressor 109 is operatively connected to an electrical generator 110. When driven, the electrical generator 110 may provide electrical power to one or more electrical systems 10E of the aircraft 10. In other embodiments, the electrical generator 110 may be connected to a different element of the APU 100, to be driven by the different element. The electrical generator 110 may be a conventional electrical generator as used in aircraft for example. The one or more electrical systems 10E may be any suitable electrical systems electrically connected to the electrical generator 110 via, for example, conventional electrical connections and controls. The electrical generator 110 is a non-limiting example of a load that may be operatively interconnected with the load compressor 109. The load compressor 109 is a non-limiting example of a load that may be driven by the APU 100.

Now turning to the drivetrain architecture of the APU 100, in this embodiment, the high pressure compressor 103, the high pressure turbine 105, and the power turbine 106 are coaxial and rotatable about an engine axis (X). The high pressure compressor 103 is connected to the high pressure turbine 105 via a high pressure shaft 103S to be driven by the high pressure turbine 105. The power turbine 106 is connected to a bevel differential gearbox 107 (i.e. a gearbox that includes a gear train comprising both a differential and one or more bevel gears interconnecting the shafts as described herein to allow for the angular relationships described herein). More particularly, the power turbine 106 is connected to a gearbox input shaft 106S of the bevel differential gearbox 107, which serves as an input to the bevel differential gearbox 107. In this embodiment, a first output shaft 107S1 and a second output shaft 107S2 are operatively connected to the gearbox input shaft 106S via the bevel differential gearbox 107, to be driven by the gearbox input shaft 106S.

Accordingly, the output shafts 107S1, 107S2 may be driven by rotating the gearbox input shaft 106S, and may rotate at different rotational speeds relative to each other depending on the load on each of the output shafts 107S1, 107S2 for example. More particularly, as shown in FIG. 1, in the present embodiment, the high pressure shaft 103S and the gearbox input shaft 106S are coaxial, extend away from each other, and are decoupled from each other so as to be rotatable at different rotational speeds in at least some operating conditions of the APU 100. In some embodiments, the high pressure shaft 103S and the gearbox input shaft 106S may non-coaxial. In this particular embodiment, the high pressure shaft 103S and the gearbox input shaft 106S are spaced from each other, and are not disposed one inside the other. In some embodiments, this need not be the case. Since the high pressure shaft 103S and the gearbox input shaft 106S are decoupled from each other, the high pressure compressor 103 and the high pressure turbine 105 are decoupled from the power turbine 106 and may thus rotate at a different speed than the power turbine 106 in at least some operating conditions of the APU 100. This structure may help improve at least some characteristics of the APU 100, such as an operating efficiency some applications and operating conditions for example. This structure may also help make assembly and/or maintenance of the APU 100 easier in at least some embodiments and/or applications.

Still referring to FIG. 1, in the present embodiment, the first output shaft 107S1 connects the bevel differential gearbox 107 to the boost compressor 102 to drive the boost compressor 102. The second output shaft 107S2 connects the bevel differential gearbox 107 to the load compressor 109 and to the generator 110 to drive the load compressor 109 and the generator 110. The bevel differential gearbox 107 allows the boost compressor 102, and the load compressor 109 and generator 110 pair, to rotate at different speeds, depending on the loads on the boost compressor 102 and the load compressor 109/generator 110 for example. In this embodiment, since the generator 110 is connected to the same output shaft 107S2 as the load compressor 109, the load compressor 109 and the generator 110 are coupled to each other and rotate coaxially as a pair at the same speed.

In an aspect, the coupling between the generator 110 and the load compressor 109 may help improve an operating efficiency and/or stability of the APU 100 in at least some operating conditions. For example, at times there may be insufficient load on the load compressor 109, and hence insufficient load on the second output shaft 107S2. In at least some such operating conditions, the generator 110 may be controlled, via one or more controllers of the APU 100 and/or the aircraft 10, for example by demanding additional electrical/power output therefrom, to add at least some load to the second output shaft 107S2 and to thereby reduce a load imbalance that may otherwise occur between the first output shaft 107S1 and the second output shaft 107S2. Similarly, an additional load to the load compressor 109 may be added at times when this is possible while there is insufficient load on the generator 110. Such control sequences may be executed using one or more controllers, such as conventional controllers, of the aircraft 10 for example.

Still describing drivetrain aspects of the APU 100, as schematically shown in FIG. 1, in this embodiment the bevel differential gearbox 107 is structured, via a corresponding number and layout of bevel gears for example, such that the first output shaft 107S1 and the second output shaft 107S2 are disposed at right angles relative to the gearbox input shaft 106S, and therefore rotate non-parallel to the engine axis (X). In some embodiments, the first output shaft 107S1 may be positioned between 0 degrees and 90 degrees relative to the gearbox input shaft 106S (exclusive of the 0 degrees and inclusive of the 90 degrees), so as to rotate non-parallel to the engine axis (X). In some such embodiments, the second output shaft 107S2 may be positioned between 0 degrees and 90 degrees relative to the gearbox input shaft 106S (exclusive of the 0 degrees and inclusive of the 90 degrees), so as to rotate non-parallel to the engine axis (X). The first output shaft 107S1 and the second output shaft 107S2 may define any suitable angle between each other, such as a non-zero angle, depending on each particular component layout of the APU 100 for example. In one example, the bevel differential gearbox 107 may have one or more conventional bevel gears to provide for the relative angular positions of the shafts 106S, 107S1, 107S2, as described above. While the above configurations may provide advantages in at least some embodiments and/or applications, in some embodiments, the first output shaft 107S1 and the second output shaft 107S2 may be one inside the other (e.g., coaxial) at least in part, hence may be co-rotating or counter-rotating, and hence may define a zero angle therebetween (e.g., parallel).

As described above, in an aspect, such relative positioning of the shafts 106S, 107S1, 107S2 may help provide a sufficiently large space via which to run the portion 101SP of the core air flow path 101 downstream of the combustor 104, thereby allowing for the downstream portion 101SP to be made substantially or at least generally straight. More particularly, such shaft layouts may allow to position one or more of, and in some embodiments all of, the boost compressor 102, the working air flow path 108, the portion of the core air flow path 101 upstream of the boost compressor 102, the load compressor 109, and the generator/load(s) 110, non-parallel to the engine axis (X). In some embodiments, the foregoing shaft layouts may allow to laterally space these components away from the downstream portion 101SP of the core air flow path 101.

For example, as shown schematically in FIG. 1, in the present embodiment: a) the boost compressor 102, the working air flow path 108, the portion of the core air flow path 101 upstream of the boost compressor 102, the load compressor 109, and the generator 110 are all positioned on one side of both the engine axis (X) and the portion 101SP of the core air flow path 101 downstream of the high pressure compressor 103, while: b) the bevel differential gearbox 107 is positioned on the other side of the engine axis (X) and the portion 101SP of the core air flow path 101 downstream of the high pressure compressor 103. This architecture may be provided by, for example, selecting suitable corresponding angles and lengths of the output shafts 107S1, 107S2.

In the illustrated embodiment, the boost compressor 102, the high pressure compressor 103, and the load compressor 109 are centrifugal compressors, such as suitable conventional centrifugal compressors. In other embodiments, the boost compressor 102 and/or the high pressure compressor 103 and/or the load compressor 109 and/or the high pressure compressor 103 may be different types of compressors, such as axial for example, respectively, so long as at least some of the functionality and at least one of the arrangements of the APU 100 described above architecture as described herein are provided. In the illustrated embodiment, the high pressure turbine 105 and the power turbine 106 are axial turbines, respectively, such as suitable conventional axial turbines. In other embodiments, the high pressure turbine 105 and/or the power turbine 106 may be different types of turbines, respectively, so long as at least some of the functionality and at least one of the arrangements of the APU 100 described above architecture as described herein are provided. The air inlet 101IN, the outlet 101OUT and the fluid interconnections between the various elements of the core air flow path 101 may be defined using any suitable elements, such as air ducts, elbows, seals, and the like. The air inlet 101IN, the outlet 101OUT and the various fluid interconnections are therefore not shown in detail and not described in detail herein.

Still referring to FIG. 1, in some embodiments, the APU 100 may have two compartments 100A, 100B, which in one non-limiting example may be made from conventional structural elements, such as suitably interconnected conventional frame elements for example. The compartments 100A, 100B may be structured to be connectable to each other, using conventional fasteners and corresponding flanged connections, or any other suitable connections for example, to make up a completed APU 100. More particularly, in some embodiments, the compartment 100A may be a core compartment 100A which may include: the high pressure compressor 103, the combustor(s) 104, the shaft 103S, the high pressure turbine 105, the power turbine 106, and the shaft 106S. In some such embodiments, the compartment 100B may be an interchangeable compartment 100B, and may include, for example, the boost compressor 102, the load compressor 109, the gearbox 107, and the output shafts 107S1, 107S2. In other embodiments, the parts of the APU 100 may be distributed between the compartments 100A, 100B in a different combination.

In some embodiments, each of the compartments 100A, 100B and their respective components may be sized to suit particular one or more applications of the APU 100. As an example, an application may be particular multiple different models of an aircraft 10. For example, in some embodiments, the core compartment 100A and its components may be constructed and selected, respectively, to suit a plurality of different aircraft 10, and to be removably operatively connectable to a plurality of different interchangeable compartments 100B. In some such embodiments, each of the interchangeable compartments 100B may be equal in number to the number of the plurality of different aircraft 10, and may be constructed and selected such that each of the interchangeable compartments 100B suits one aircraft 10 of the plurality of different aircraft 10. Accordingly, with such a combination of the core compartment 100A and multiple different interchangeable compartments 100B may be used to assemble an APU 100 to suit any one of the plurality of different aircraft 10. That is, the same core compartment 100A may be used for each of the different aircraft 10, with a different interchangeable compartment 100B connected to the core compartment 100B depending on each particular aircraft 10. In an aspect, such a method of assembling APUs may be more effective and/or cheaper than at least some prior art methods.

Figure 2:
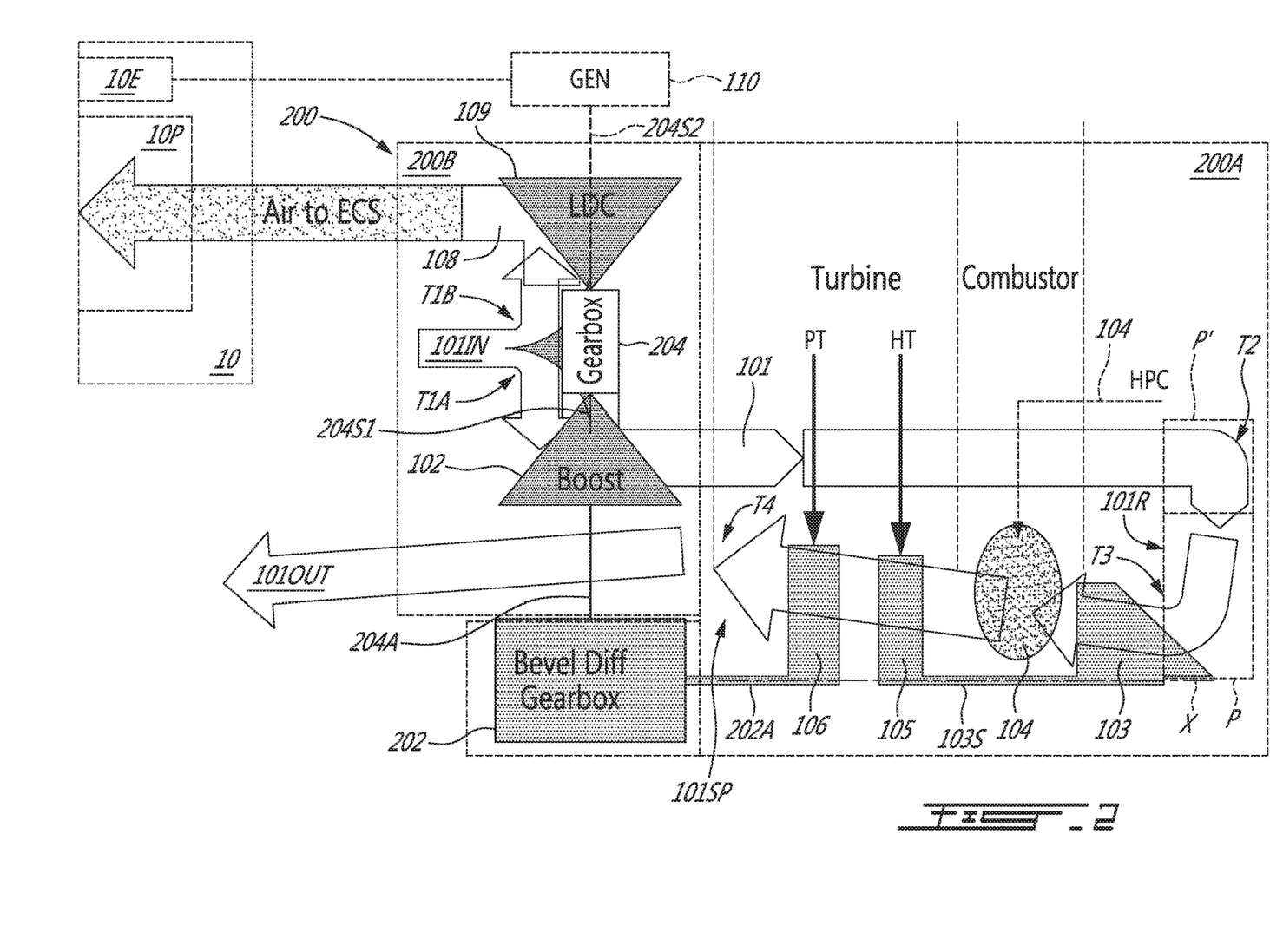
FIG. 2 is a schematic showing an auxiliary power unit, according to another embodiment.

Now referring to FIG. 2, an APU 200 is schematically shown. The APU 200 is similar to the APU 100, and therefore parts of the APU 200 corresponding to parts of the APU 100 have been labeled with the same reference numerals. A difference between the APU 200 and the APU 100 is that instead of the bevel differential gearbox 107, the APU 200 includes a bevel gearbox 202, and a differential gearbox 204.

In this embodiment, an input shaft 202A connects the bevel gearbox 202 to the power turbine 106 to be driven by the power turbine 106. An output shaft 204A connects the bevel gearbox 202 to the differential gearbox 204 and serves as an input to the differential gearbox 204. The bevel gearbox 202 is structured, using a suitable bevel gear arrangement (E.g. see FIG. 5), such as a conventional bevel gear arrangement for example, to provide for non-parallel rotation of the output shaft 204A relative to the input shaft 202A. More particularly, in this embodiment, the output shaft 204A is positioned at, and rotates, at a right angle relative to the input shaft 202A. In other embodiments, this angle may be between 0 degrees and 90 degrees, exclusive of the 0 degrees and inclusive of the 90 degrees.

In turn, in this embodiment a first output shaft 204S1 connects the differential gearbox 204 to the boost compressor 102. A second output shaft 204S2 connects the differential gearbox 204 to the load compressor 109 and the generator 110. The first and second output shafts 204S1, 204S2 are operatively connected to the output shaft 204A via the differential gearbox 204. The first and second output shafts 204S1, 204S2 are therefore driven by rotation of the output shaft 204A, and hence by power from the power turbine 106 as transmitted to the output shaft 204A via the input shaft 202A and the bevel gearbox 202. The differential in the differential gearbox 204 allows the first output shaft 204S1 to rotate at a different speed than the second output shaft 204S2 in at least some operating conditions.

In this embodiment, the differential gearbox 204 is positioned between the boost compressor 102 on one side thereof, and the load compressor 109 and the generator/load 110 on another side thereof. In this embodiment, the generator/load 110 is coaxial with the load compressor 109 and both of these components are connected to the second output shaft 204S2 to be driven at the same speed as the second output shaft 204S2. In this embodiment, the first and second output shafts 204S1, 204S2 are coaxial, are spaced from each other, and extend away from each other. In an aspect, such positioning of the differential gearbox 204 and/or the coaxial arrangement of the output shafts 204S1, 204S2 may help simplify lubrication of these components. However, in other embodiments, the first and second output shafts 204S1, 204S2 may define an angle between 0 and 180 degrees relative to each other.

Power from the power turbine 106 is transferred via the arrangement described above to the boost compressor 102 and the load compressor 109, with the boost compressor 102 and the load compressor 109 being rotatable at different speeds in at least some operating conditions of the APU 200. It is contemplated that in some embodiments, additional gearing for example, may be added for example between the load compressor 109 and the generator/load 110 to allow the load compressor 109 to be rotatable at a different speed than the generator/load 110 in at least some operating conditions of the APU 200.

In this embodiment, the output shaft 204A is angled relative to the first and second output shafts 204S1, 204S2, and it is contemplated that any angle suitable to each given layout of the APU 200 may be used here. As schematically shown in FIG. 2, in this embodiment, the first and second output shafts 204S1, 204S2, and the output shaft 204A are non-parallel to the engine axis (X). Further, the output shaft 204A is sized sufficiently long to provide enough space between the bevel gearbox 202 and the boost compressor 102 to pass a generally straight or a substantially straight downstream portion 101SP of the core air flow path 101 between the bevel gearbox 202 and the boost compressor 102. To this end, in this embodiment, the output shaft 204A is at a right angle to the engine axis (X), and the generally straight portion 101SP of the core air flow path 101 extends past the output shaft 204A.

In other embodiments, and depending on the relative sizing and layout of the components of the APU 200 for example, the bevel gearbox 202 and the differential gearbox 204 may be structured, using corresponding conventional bevel gearing for example, such that the output shaft 204A is positioned between about 160 degrees and about 30 degrees with respect to the engine axis (X). Stated more generally, the output shaft 204A may be sized sufficiently long and may be angled relative to the engine axis (X) so as to allow for the bevel gearbox 202 to be positioned on one side of the generally straight portion 101SP of the core air flow path 101, while positioning the boost compressor 102, the differential gearbox 204, the load compressor 109, and the generator/load 110 on an opposite side of the generally straight portion 101SP of the core air flow path 101. In an aspect, such architecture may help reduce a length of the APU 200 in comparison with at least some prior art APUs of a similar power output and application.

As shown in FIG. 2, in some embodiments, the APU 200 may be compartmentalized and assembled similarly to the methods of compartmentalization and assembly described with respect to the APU 100 above. For example, as shown, in some embodiments, the APU 200 may have a core compartment 200A structured to be operatively connectable with any one of a plurality of different interchangeable compartments 200B, one example of which is shown in FIG. 2. In the non-limiting embodiment shown, the core compartment 200A includes the high pressure compressor 103, the shaft 103S, the combustor(s) 104, the high pressure turbine 105, the power turbine 106, and the shaft 202A. In the non-limiting embodiment shown, the interchangeable compartment 200B includes the boost compressor 102, the load compressor 109, the differential gearbox 204 and the shaft 204A. In some embodiments, the interchangeable compartment 200B may also include the bevel gearbox 202, while in other embodiments the bevel gearbox 202 may be provided in a separate interchangeable compartment that is operatively connectable to the compartments 200A, 200B. In some embodiments, the core compartment 200A may include the bevel gearbox 202 and the output shaft 204A. Other combinations of components of the APU 200, and any suitable corresponding structure of the compartments 200A, 200B, may be used to suit each particular embodiment and application of the APU 200. It is contemplated that the APU 200 may be compartmentalized into more than the two compartments 200A, 200B, at least some of which may be interchangeable. In some embodiments, the APU 200 may be provided as a single unit/compartment.

Figure 3:
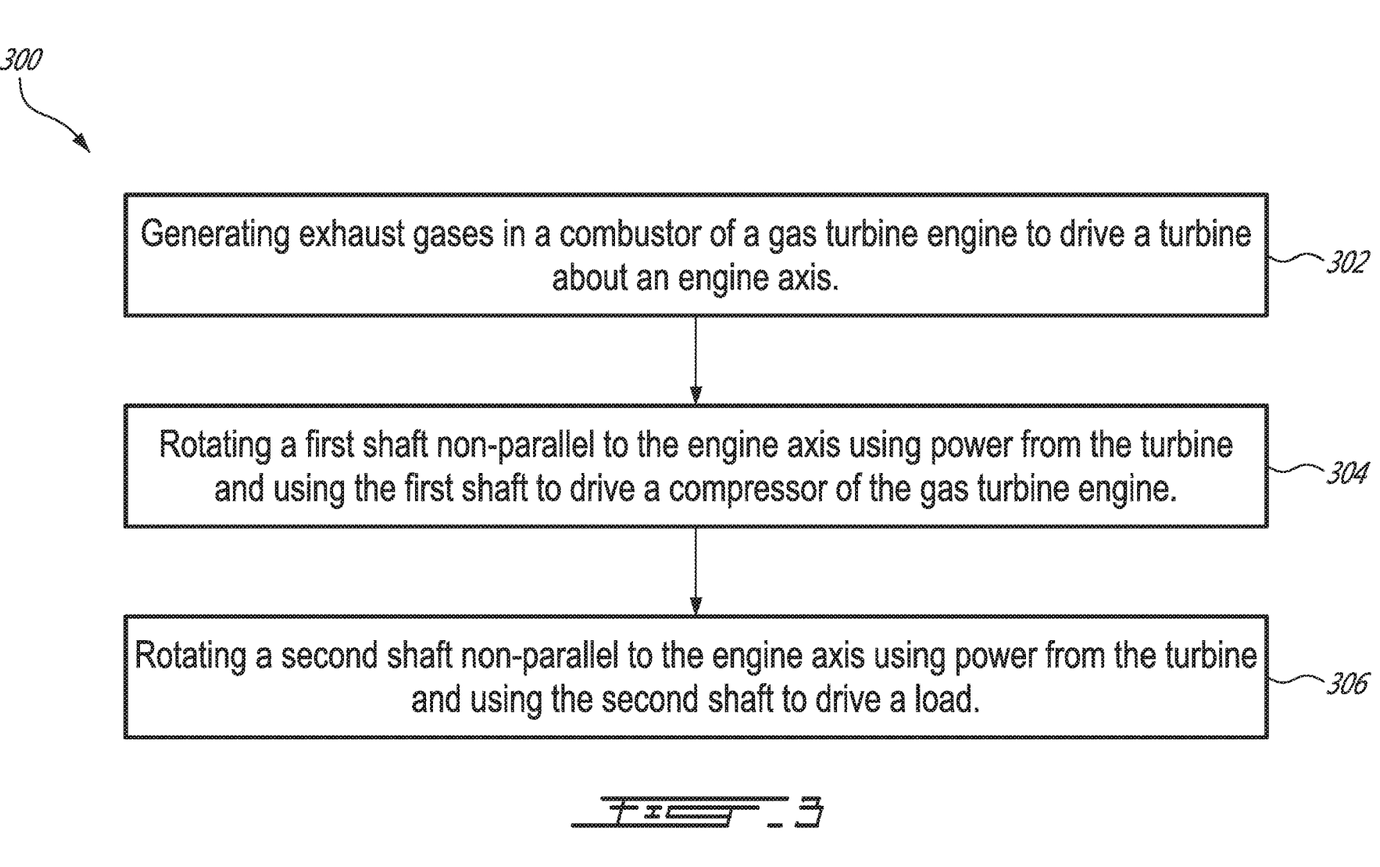
FIG. 3 is a schematic showing a method of operating a gas turbine engine.

With the structure above in mind, and now referring to FIG. 3, there is provided a method 300 of operating a gas turbine engine, such as the APU 100 or the APU 200. The method 300 may include a step 302 of generating exhaust gases in a combustor 104 of the gas turbine engine 100, 200 to drive a turbine, such as the power turbine 106, about an engine axis (X). The method 300 may also include a step 304 of rotating a first output shaft, such the first output shaft 107S1 or the first output shaft 204S1 for example, non-parallel to the engine axis (X) using power from the turbine 106 and using the first output shaft to drive a compressor, such as the boost compressor 102, of the gas turbine engine 100, 200. In some embodiments, the driving the boost compressor 102 may be executed for compressing ambient air supplied into the combustor 104. In an aspect, this may help reduce a load and/or a size of a high pressure compressor 103 of the gas turbine engine 100, 200.

In some such embodiments, the method 300 may further include a step 306 of rotating a second output shaft, such as the second output shaft 107S2 or the second output shaft 204S2 for example, non-parallel to the engine axis (X) using power from the turbine 106 and using the second shaft to drive. As seen above, in some embodiments, the driven load may be a load compressor 109 and/or an electrical generator 110 for example. As seen above, in some embodiments, driving a load compressor 109 may be executed to supply working air to a pneumatic system 10P of an aircraft 10, such as a helicopter or an airplane for example. Also as seen above, in some embodiments, driving an electrical generator 110 may be executed to power an electrical system 10E of an aircraft 10, such as a helicopter or an airplane for example. It is contemplated that yet other one or more loads may be driven this way, either instead of or in combination with one or both of the load compressor 109 and the electrical generator 110. As seen above, in some embodiments, the electrical generator 110 may be part of the APU 100, 200, while in other embodiments it may be a separate element driven by the APU 100, 200. In some embodiments and applications, the electrical generator 110 may be omitted.

The APUs 100, 200 and other engines, as well as aircraft, with or into which the present technology is implemented, may be constructed and operated using known materials and manufacturing methods, and using known methods of operation. For example, known gas turbine engine start-up and shut-down methods may be used to start up and subsequently shut down, as may be needed, each given embodiment of the APUs 100, 200.

As another example, the various gearboxes, turbines, compressors, combustor(s), and other elements of the APUs 100, 200 described above may be selected and sized using any engineering techniques and controls, such as conventional engineering techniques and controls, suitable to each particular application and method of operating the APUs 100, 200, to provide for the various combinations of functions described above. As a more particular example, in some embodiments, the differential gearbox 204 of the APU 200 may have the configuration shown in FIG. 4. As shown, in such embodiments, the gear train 204G of the differential gearbox 204 may include a compound epicyclic gear sets, and more particularly may contain one or more interconnected epicyclic (differential) gears, for example, epicyclic planetary gear sets 400A, 400B, 400C.

Figure 4:
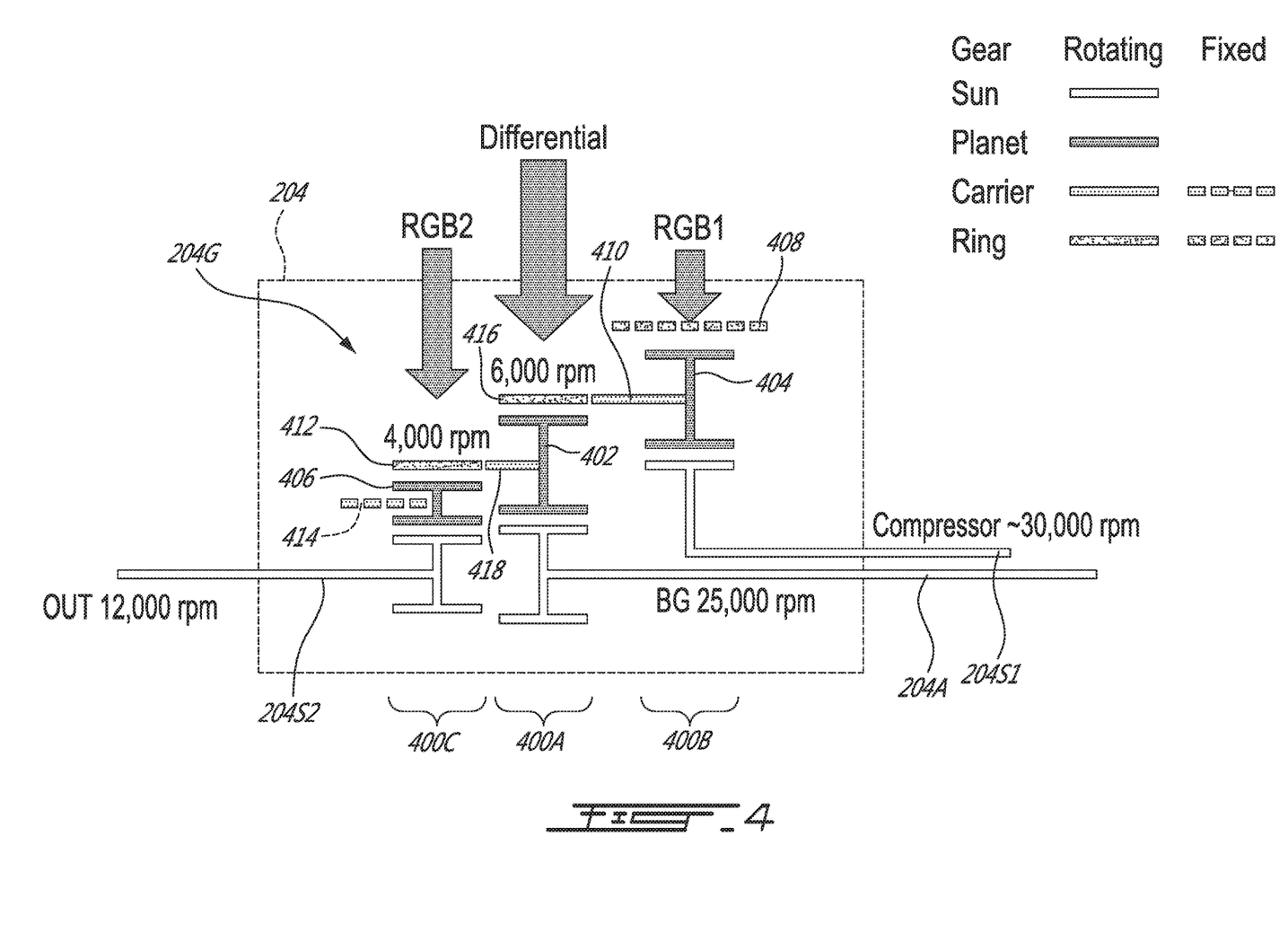
FIG. 4 is a schematic showing a differential gearbox of the auxiliary power unit of FIG. 2.

The shaft 204A from the bevel gearbox 202 may be connected to a sun gear 402 of a first planetary gear set 400A (labeled "Differential" in FIG. 4). The shaft 204S1 powering the boost compressor 102 may be connected to a sun gear 404 of a second planetary gear set 400B (labeled "RGB1" in FIG. 4). The shaft 204S2 powering the load compressor 109 and/or load(s) 110 may be connected to a sun gear 406 of a third planetary gear set 400C (labeled "RGB2" in FIG. 4). In some embodiments, shaft 204S1 powering the boost compressor 102 may be connected to a ring gear 408 of a second planetary gear set 400B or a carrier 410 of a second planetary gear set 400B, depending on the speed of the component(s) driven by the shaft 204S1.

In some embodiments, the shaft 204S2 powering the load compressor 109 and/or load(s) 110 may be connected to a ring gear 412 of a third planetary gear set 400C or a carrier 414 of a third planetary gear set 400C, depending on the speed of the component(s) driven by the shaft 204S2. "RGB1" and "RGB2" may operate as a reduction gear set. Reduction gears such as "RGB1" and "RGB2" may be fixed and may be used to scale up or down the rotational speed (revolutions per minute) that are output from the "Differential" gear set. In some embodiments, reduction gear sets or gearboxes may or may not be integral with "Differential" or disposed within differential gearbox 204, or may be disposed in a separate location from the differential gear set or differential gearbox. In some embodiments, reduction gear sets or gearboxes may or may not be present. Reduction gear sets may or may not be planetary gear sets.

FIG. 4 illustrates an interconnection between the carrier 410 of "RGB1" and ring gear 416 of "Differential", and an interconnection between a carrier 418 of "Differential" and the ring gear 412 of "RGB2". As noted in FIG. 4, the ring gear 408 of "RGB1" and the carrier 414 of "RGB2" are fixed. The remaining components rotate.

In an example as shown in FIG. 4, with appropriate gear ratios, the shaft 204 from the bevel gearbox 202 and the sun gear 402 of "Differential" may rotate at 25,000 rpm, rotating the ring gear 416 of "Differential" at 6,000 rpm, and thus rotating the carrier 410 of "RGB1" at 6,000 rpm. The carrier 418 of "Differential" rotates at 4,000 rpm, thus rotating the ring gear 412 of "RGB2" at 4,000 rpm. Reduction gear "RGB1" thereby rotates its sun gear 404 and thus the shaft 204S1 powering the boost compressor 102 at 30,000 rpm, and reduction gear "RBG2" thereby rotates its sun gear 406 and thus the shaft 204S2 powering the load compressor 109 and/or load(s) 110 at 12,000 rpm. These speeds are provided for reference, and may not specifically refer to a particular design. Other suitable speed ranges may be contemplated.

The differential gearbox 204 may thus split power and torque between the shafts 204S1 and 204S2. Unlike a standard gear set that transfers power and reduces torque in a linear fashion, the differential gearbox 204 may split power between the shafts (for example, 204S1 and 204S2 based on speed and gear ratio of the gears described above in the differential gearbox 204. The differential gearbox 204 may thus split torque between the shafts 204S1 and 204S2 at a constant ratio that may be determined by a gear ratio such as the ratio of the sun gear to the ring gear, for example, in the "Differential" gear of FIG. 4. In some embodiments, the shafts 204A, 204S1, 204S2 may be interchanged between the gears described herein, depending on power split requirements. In an example, the shaft 204S2 may not run off carrier 418 of "Differential", and the shaft 204S1 may not run off ring gear 416 of "Differential".

APU 200 may thus be able to maintain a constant output shaft speed of the load shaft 204S2 (in an example, 12,000 rpm), while increasing or decreasing the speeds of the shaft 204S1 and the shaft 204A as output power increases or decreases. Allowing the speeds of the shafts 204S1 and 204A to vary may allow each component to operate at a more effective region of its operating range, and may make the APU 200 more efficient. In some embodiments, differential gearbox 204 may include as few as one planetary (the "differential") with standard reduction gears on from one to three input/output shafts. In some embodiments, differential gearbox 204 may include as many as three additional epicyclic gear sets (four total) with or without additional RGBs. In some embodiments, differential gearbox 204 may include any other suitable combination of epicyclic and reduction gear sets.

Figure 5:
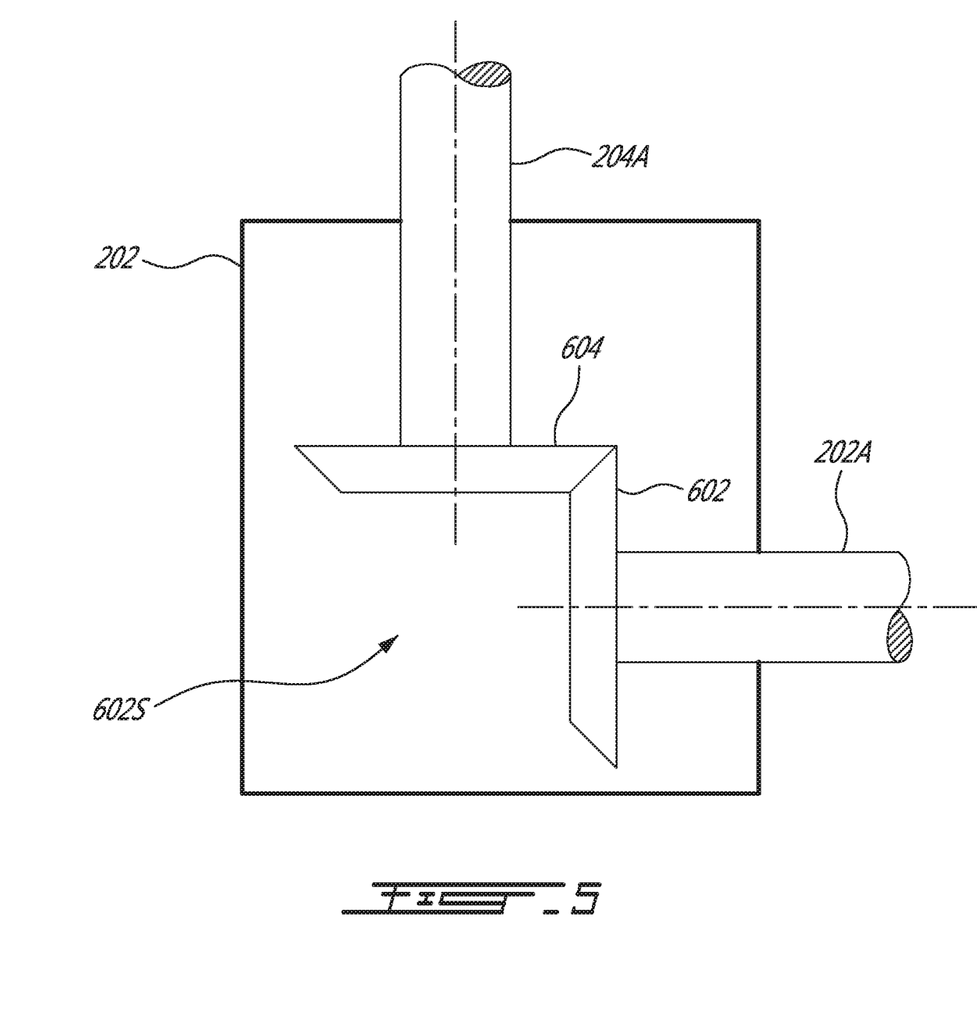
FIG. 5 is a schematic showing a bevel gearbox of the auxiliary power unit of FIG. 2.

As another example, FIG. 5 shows an example of one embodiment of the bevel gearbox 202 that may be used to help provide for the arrangements of the shafts 202, 204A, 204S1 and 204S2 described above with respect to the APU 200. As shown, the shaft 202A from the power turbine 106 comes into the bevel gearbox 202 and operatively connects to the shaft 204A powering the differential gearbox 204 via two bevel gears 502, 504 that mesh with each other. The shape and configuration of the bevel gears 502, 504 in this embodiment is selected such that the shafts 202, 204A rotate orthogonal to each other. However, other shape and configuration of the bevel gears 502, 504 and/or a different number of the bevel gears 502, 504 may be used to provide for the other possible angles between the shafts 202, 204A as described above with respect to the APU 200. While in this embodiment the bevel gears 502, 504 are shown to have one and the same diameter, and thus providing a 1:1 gear ratio, in other embodiments the bevel gears 502, 504 may be selected to provide other gear ratios, depending on each particular embodiment of the APU 200 and the differential gearbox 204 for example.

Figure 6:
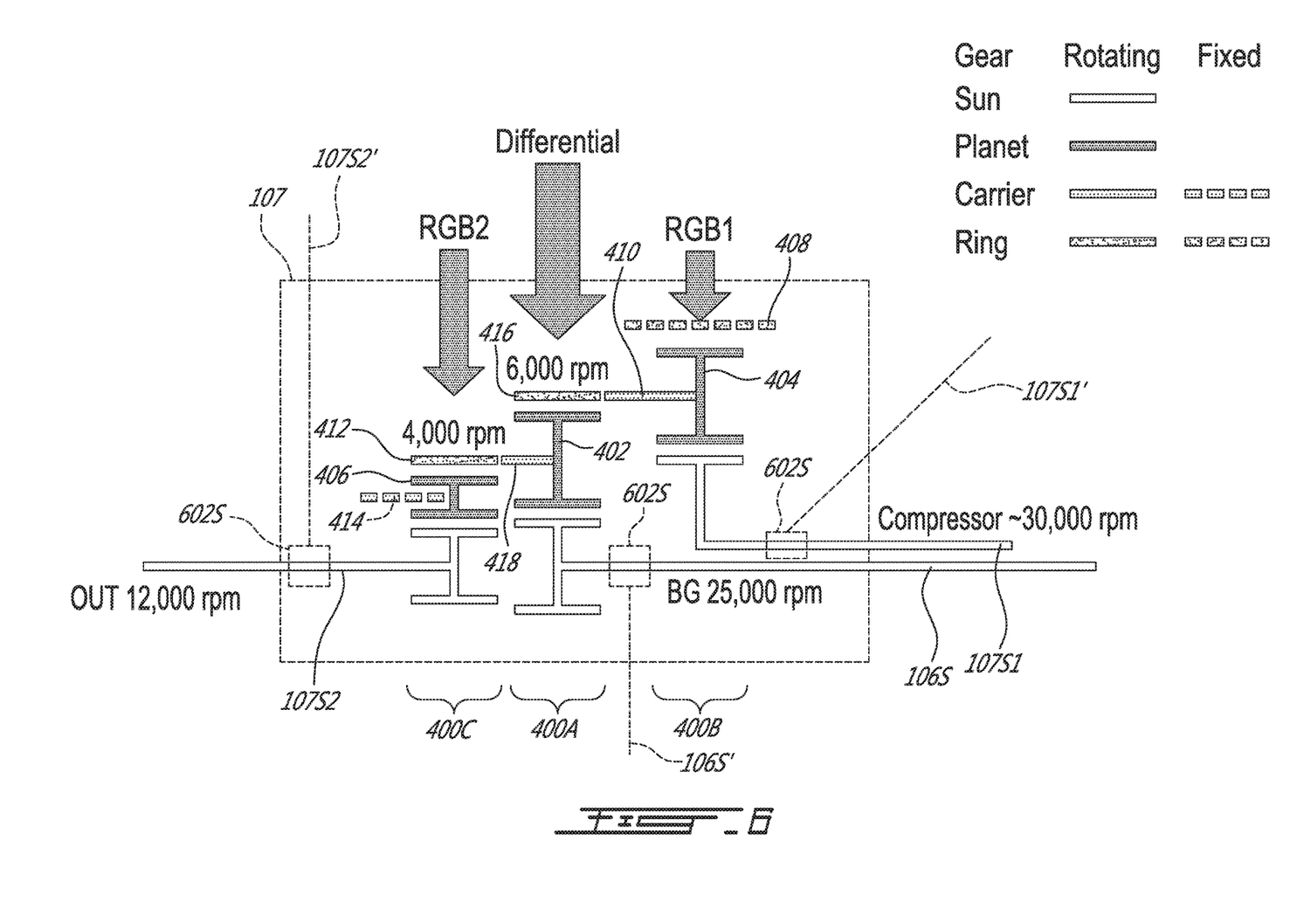
FIG. 6 is a schematic showing a bevel differential gearbox of the auxiliary power unit of FIG. 1.

As yet another example, FIG. 6 shows an example of one embodiment of the bevel differential gearbox 107 that may be used in the APU 100. In some embodiments, the bevel differential gearbox 107 may be similar to the differential gearbox 204 with respect to the epicyclic planetary gear sets 400A, 400B, 400C and their gears. Therefore, these components have been labeled with the same reference numerals as used in FIG. 4. A difference of the bevel differential gearbox 107 with respect to the differential gearbox 204 may be that in some embodiments the bevel differential gearbox 107 may include one or more bevel gears and/or corresponding meshed bevel gear pairs, similar to the meshed pair of the bevel gears 502 and 504 described above, which may be used to help provide for the arrangements of the shafts 106S, 107S1, and 107S2 described above with respect to the APU 100.

For example, depending on each particular embodiment of the APU 100 and the particular layout of the components of the APU 100, one or more of the shafts 106S, 107S1, 107S2 may have bevel gears 502, 504, and in some embodiments one or more meshed pair of the bevel gears 502, 504, shown as 602 in FIG. 6, to provide for each particular desired routing and orientation of the shafts 106S, 107S1, 107S2 relative to the engine axis (X) as described above. Such bevel gear(s) 602 may be similar to the bevel gears 502, 504 and are therefore not described in detail again. For illustration purposes, an alternative arrangement/angle of each of the shafts 106S, 107S1, 107S2 that may be achieved with meshed sets 602S of two or more bevel gears is shown with respective reference numerals 106S', 107S1', and 107S2'. As shown, in some such embodiments, one or more of the shafts 106S', 107S1', and 107S2' may include two or more parts that are meshed with each other and angled relative to each other.

In summary, engine architecture including one or more of the drivetrain configurations of the present technology described in this document may help make a given engine more compact and/or more efficient and/or more stable in at least some applications and/or operating conditions, and/or may help make assembly and/or maintenance thereof easier in at least some embodiments and/or applications, relative to at least some prior art engines of similar type and output operating in similar operating conditions. In some embodiments, engine architecture of the present technology may help facilitate a modular design of a given engine for a relatively wider range of power and/or ECS requirements.

The various embodiments, variations, and contemplated variations, shown and/or described in this document are non-limiting. For example, while in some embodiments the turbine 105 and/or 106 may be single stage, in other embodiments the turbine 105 and/or 106 may be multi-stage. As another example, while the compressor 102 and/or the compressor 103 may be of a centrifugal type, in other embodiments the compressor 102 and/or the compressor 103 may be of an axial type (such as a single stage or multi stage axial, for example depending on the compression ratio that the given compressor may be designed for in each particular embodiment and application). One skilled in the art will recognize that many changes may be made to such embodiments and variations without departing from the scope of the present technology.

The invention claimed is:

1. An auxiliary power unit (APU) of an aircraft, comprising:
    a core gas flow path defined by, in serial flow communication, an air inlet for receiving ambient air, a boost compressor, a high pressure compressor, a combustor and a turbine, the turbine and the high pressure compressor rotatable about an engine axis;
    a first shaft operatively connecting the turbine to the boost compressor, the first shaft extending non-parallel to the engine axis; and
    a second shaft operatively connecting the turbine to a load, the second shaft extending non-parallel to the engine axis;
    wherein:
        the first shaft operatively connects the turbine to the boost compressor via a gear train and a third shaft connected to the turbine;
        the second shaft is operatively connected to the turbine via the gear train; and
        a portion of the core gas flow path downstream of the combustor extends between the gear train and the boost compressor.

2. The APU of claim 1, wherein the first shaft is oriented at a first non-zero angle to the engine axis, the first non-zero angle being equal to or smaller than 90 degrees.

3. The APU of claim 2, wherein the second shaft is oriented at a second non-zero angle to the engine axis, the second non-zero angle being equal to or smaller than 90 degrees.

4. The APU of claim 1, wherein the first shaft is substantially perpendicular to the engine axis.

5. The APU of claim 4, wherein the second shaft is substantially perpendicular to the engine axis.

6. The APU of claim 1, wherein the gear train is a differential gear train.

7. The APU of claim 6, wherein the differential gear train includes a bevel gear.

8. The APU of claim 1, wherein:
    the gear train is a differential gear train; and
    the third shaft is connected to a bevel gear train.

9. The APU of claim 1, wherein the load includes at least one of: a load compressor, and a generator.

10. The APU of claim 1, wherein:
    the turbine is a power turbine,
    the APU includes a high pressure turbine in serial flow communication with the combustor,
    the high pressure turbine and the power turbine are part of the core gas flow path, and
    the core gas flow path includes a flow reversing section fluidly disposed between the boost compressor and the high pressure compressor.

11. A gas turbine auxiliary power unit (APU) of an aircraft, comprising a core gas flow path defined by, in serial flow communication,
    an air inlet for receiving ambient air, a first engine compressor, a second engine compressor, a combustor and a turbine,
    the second engine compressor and the turbine being rotatable about an engine axis, the first engine compressor configured to be driven by the turbine, a rotation axis of the first engine compressor being non-parallel to the engine axis;
    wherein:
        the APU includes a gear train connecting the turbine to the first engine compressor; and
        a portion of the core gas flow path downstream of the combustor extends between the gear train and the first engine compressor.

12. The gas turbine APU of claim 11, wherein the gear train is a differential gear train.

13. The gas turbine APU of claim 12, wherein the core gas flow path includes a flow reversing section.

14. The gas turbine APU of claim 11, further comprising an electrical generator connected to the first engine compressor.

15. A method of operating an auxiliary power unit (APU) of an aircraft, comprising:
- generating exhaust gases in a combustor of a gas turbine engine to drive a turbine about an engine axis;
- rotating a first shaft non-parallel to the engine axis using power from the turbine and using the first shaft to drive a compressor disposed in a core gas path of the gas turbine engine; and
- rotating a second shaft non-parallel to the engine axis using power from the turbine and using the second shaft to drive a load;

wherein:
- the APU includes a clear train connecting the turbine to the compressor; and
- the method comprises directing the exhaust gases through a portion of the core pas path extending between the clear train and the compressor.

16. The method of claim 15, wherein the driving the load includes driving a load compressor to supply air to a pneumatic system of the aircraft.

17. The method of claim 16, wherein the driving the load includes driving an electric generator to power an electrical system of the aircraft.

* * * * *